(12) United States Patent
Ron et al.

(10) Patent No.: US 10,594,764 B2
(45) Date of Patent: Mar. 17, 2020

(54) REQUEST CACHE TO IMPROVE WEB APPLICATIONS PERFORMANCE

(71) Applicant: Oracle International Corporation, Redwood Shores, CA (US)

(72) Inventors: Juan Allo Ron, Foster City, CA (US); Ariel Cohen, Foster City, CA (US); Esteban Alejandro Capillo Carril, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 385 days.

(21) Appl. No.: 15/478,043

(22) Filed: Apr. 3, 2017

(65) Prior Publication Data

US 2018/0084075 A1 Mar. 22, 2018

Related U.S. Application Data

(60) Provisional application No. 62/395,968, filed on Sep. 16, 2016.

(51) Int. Cl.
| | |
|---|---|
| *G06F 15/16* | (2006.01) |
| *H04L 29/08* | (2006.01) |
| *G06F 9/46* | (2006.01) |

(52) U.S. Cl.
CPC .............. *H04L 67/02* (2013.01); *G06F 9/46* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 2003/0065826 A1* | 4/2003 | Skufca | ............... | H04L 67/02 |
| | | | | 719/315 |
| 2016/0140100 A1* | 5/2016 | Carr | .................. | G06F 8/38 |
| | | | | 715/222 |

OTHER PUBLICATIONS http://www.tutorialspoint.com/jsf/jsf_life_cycle.htm—JSP Life Cycle—downloaded Feb. 27, 2017—4 pages.
http://stackoverflow.com/questions/2090033/why-jsf-calls-getters-multiple-times—Join the Stack Overflow Community—downloaded Feb. 27, 2017—7 pages.

* cited by examiner

*Primary Examiner* — Padma Mundur
(74) *Attorney, Agent, or Firm* — Trellis IP Law Group, PC

(57) ABSTRACT

A system and method for enhancing web application performance by selectively caching information used by different stages of server-side processing of a request for webpage content from a client system. An example method involves using a specialized cache requestor for selectively fetching and caching JavaBean properties once per request lifecycle. The cached JavaBeans properties may then be used by different request-processing stages of the lifecycle, thereby obviating the need to implement multiple external requests for JavaBeans properties, i.e., multiple accesses of dynamic context. The cache requestor may leverage functionality provided by a JSF phase listener (JSF phaseListener) and a JavaBean proxy (BeanProxy) to keep the retrieved state information accessible to the request processing and associated JSF container.

20 Claims, 5 Drawing Sheets

REQUEST CACHE TO IMPROVE WEB APPLICATIONS PERFORMANCE

CROSS REFERENCES TO RELATED APPLICATIONS

This application claims priority from U.S. Provisional Patent Application Ser. No. 62/395,968, entitled REQUEST CACHE TO IMPROVE JSF WEB APPLICATIONS PERFORMANCE, filed on Sep. 16, 2016, which is hereby incorporated by reference as if set forth in full in this application for all purposes.

This application is related to the following applications: U.S. Provisional Application Ser. No. 62/395,341, entitled SYSTEM FOR PROCESS CLOUD SERVICE, filed on Sep. 15, 2016 (Trellis ref ORACP0192P), which is hereby incorporated by reference as if set forth in full in this application for all purposes.

BACKGROUND

The present application relates to computing, and more specifically to systems and methods for enhancing web application performance and associated request message processing.

Web applications, e.g., server-side software applications accessible to a client (e.g., a browser or mobile application), are employed in various demanding applications, including facilitating online sales; implementing social networks; implementing enterprise process-based software applications, and so on. Such applications often demand high performance web applications that can rapidly perform complex processing steps and then render content using intuitive and user friendly graphical user interfaces.

Various software development specifications or standards and accompanying frameworks, e.g., Java Server Faces (JSF), may be employed facilitate development of server-side web applications and accompanying User Interfaces (UIs). JSF includes specifications, e.g., Application Programming Interfaces (APIs), for facilitating component-based UI development for web applications. Such APIs may be leveraged by various software development tools.

When a web application (i.e., server side application) receives a request message from a client (e.g., a browser), processing of the request message (so as to generate a response to the request message) may involve several steps or stages. However, conventional approaches to handling message processing at each stage can be inefficient. For example, different processing stages may require repeated fetching of data, e.g., context information, from various sources. The extra time required to implement the fetches can reduce message-processing performance.

SUMMARY

An example method facilitates enhancing web application performance by selectively caching information used by different stages of server-side processing of a request for webpage content from a client system. The example method is performed using server-side processing and includes receiving a request to generate one or more user interface components from a client computer; initiating processing of the request; determining when processing of the request accesses context information; detecting when the context information represents dynamic context requiring fetching of the context information from an external source (e.g., from a system or service outside of container implementing the processing), and providing a detection signal in response thereto; retrieving the dynamic context in response to the detection signal; storing the dynamic context in a cache, resulting in cached context; and using the cached context for processing of subsequent accesses to the dynamic context during the processing of the request.

In a more specific embodiment, the request represents a JavaServer Faces (JSF) request, and the processing of the request involves plural stages of processing, each stage of which may fetch or get context information for use by the stage. Fetched context information includes dynamic or static context information.

The plural processing stages may include, for example, a restore-view stage, an apply-values stage, a validate stage, an update stage, a logic-invocation stage, and a rendering stage. At each of the plural stages, one or more context fetches (also called context requests herein) are generated by the processing. The context information to be fetched may include one or more properties describing a JavaBean (JB) state.

In the specific example method, the step of detecting further includes employing a JSF phase listener to intercept or analyze context fetches during the processing of the JSF request. Detecting further includes using a JavaBean (JB) proxy to maintain the cache, which is used to store fetched dynamic context (resulting in the cached context) for use by subsequent request processing stages. The cached context may include dynamic context retrieved using one or more web services or Application Programming Interfaces (APIs) for retrieving context from outside of a container (e.g., JSF container), e.g., from another system.

The JSF phase listener (also called a Faces listener herein) may register JavaBeans (JB) in a context storage mechanism (called the container context). A cache requestor that uses the JSF phase listener retrieves and caches properties pertaining to the dynamic context for each request lifecycle.

Accordingly, embodiments discussed herein mitigate problems resulting from repeatedly using services or other mechanisms to fetch dynamic context information form external sources for each stage of a request lifecycle.

Note that conventionally, in a standard JSF webpage, code running a JSF container will ask for (fetch) a JavaBean state (i.e., its properties) multiple times, e.g., one time for each processing stage. If the data in the JavaBean is not static, but is dynamic, i.e., must be retrieved from a source outside of the JSF container (e.g., via external services), then overall request-processing speed is reduced.

To avoid such reduction in request-processing performance, a cache requestor constructed in accordance with the present teachings will fetch and cache the JavaBean properties once per request lifecycle. The cached JavaBeans properties may then be used by different request-processing stages, thereby obviating the need to implement multiple external requests for JavaBeans properties. The cache requestor may leverage functionality provided by a JSF phase listener (JSF phaseListener) and a JavaBean proxy (BeanProxy) to keep the retrieved state information accessible to the request processing and associated JSF container.

A further understanding of the nature and the advantages of particular embodiments disclosed herein may be realized by reference of the remaining portions of the specification and the attached drawings.

DETAILED DESCRIPTION OF EMBODIMENTS

Figure 1:
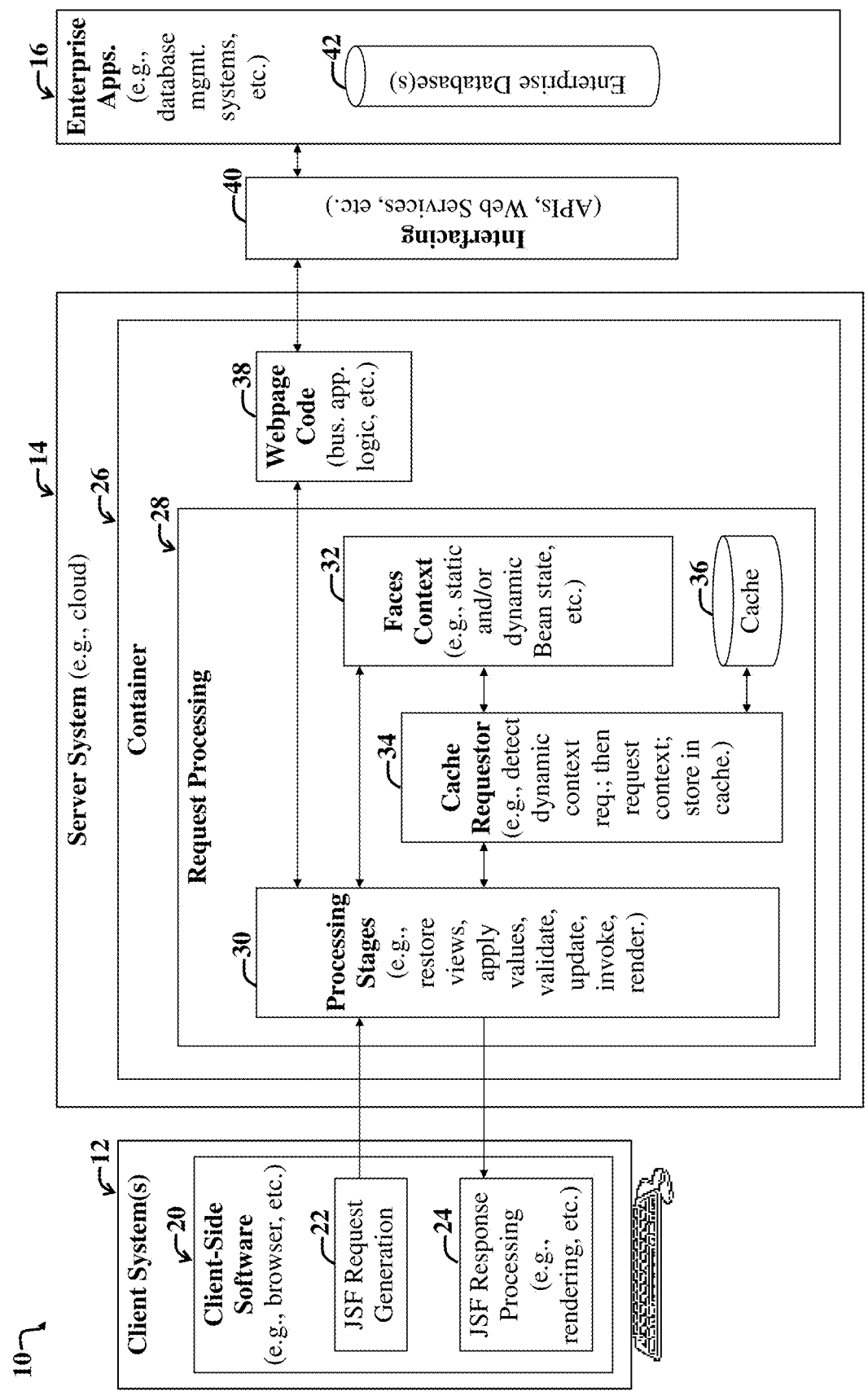
FIG. 1 is a first block diagram illustrating a first example system and accompanying computing environment enabling selective caching of information for use by different stages of a processing lifecycle used to process a message from a client computer requesting content from a server.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, JavaServer Faces (JSF) frameworks and servlets, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment enabling selective caching of information (e.g., caching of dynamic context) for use by different stages of a processing lifecycle (e.g., a JSF request message lifecycle) used to process a message (e.g., a JSF request) from one or more client computers 12 requesting content from one or more servers of a server system 14.

The overall system 10 may represent a networked computing environment, such as a cloud-based enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

Note that for the purposes of the present discussion, a server system may be a collection of one or more servers. A server system may include or represent a cloud or portion thereof.

The example client systems 12 include client-side software 20, e.g., a browser, which is usable to generate Java Server Faces (JSF) requests 22 and to process JSF responses 24. When the client-side software 20 is used to access a JSF webpage content, one or more JSF requests 22 are sent to a JavaServer Faces container 26 of the server system 14.

Accordingly, the server system 14 includes the JavaServer Faces container 26 (e.g., a J2EE servlet container). The JSF container 26 includes JSF request processing functionality 28 (also simply called JSF request processing, or JSF request processing module herein). For the purposes of the present discussion, software functionality may be any function, capability, or feature, e.g., stored or arranged data, that is provided via computer code, i.e., software.

The JSF request processing 28 includes plural processing stages 30. The plural processing stages 30 are part of a JSF request lifecycle that completes when all of the processing stages 30 are completed. The JSF request lifecycle is said to be layered, as it includes plural stages (also called phases herein), including: a restore-view stage (also called a component tree reconstruction stage), an apply-values stage (also called an apply-request-values stage involving event processing), a validating stage (also called performance-validation stage or a process-validation stage involving event processing), an updating stage (also called a model-synchronization stage or an update-model-values stage involving event processing), a logic-invocation stage (also called an application-logic-invocation stage, or an invoke-application stage involving event processing), and a rendering stage (also called a render-response stage).

The request processing module 28 further includes a JSF context module 32 (also simply called Faces context), which may include static and dynamic JavaBean (JB) properties, including properties describing state for a given JB. For the purposes of the present discussion, a JB may be a programming language class (which represents a type of computing object) that includes plural objects (e.g., collections of data and/or functionality). The terms "JavaBean" and "Bean" may be employed interchangeably herein.

The request processing module 28 is further augmented with a specialized cache requestor 34 module in communication with a local cache 36, which is readily accessible to processes within the request processing module 28 via one or more JB getters for selectively fetching context information, e.g., JB state information, from the Faces context 32 at each of the processing stages 30.

For the purposes of the present discussion, dynamic context information may be any data, e.g., properties or other state information pertaining to a Bean, that would trigger the Faces context 32 or other mechanism to retrieve the context information from an external system or service (which is external to the JSF container 26 that includes the request processing 28), as opposed to directly from the Faces context module itself (as may occur with static context), in the absence of use of the cache requestor 34.

The cache requestor 34 includes computer code for monitoring the processing stages 30 and/or fetches or gets issued thereby for information from the Faces context 32. When the cache requestor 34 determines that a particular fetch is for dynamic context, the cache requestor 34 intercepts the request; retrieves the dynamic context (e.g., by calling an external service, API, and/or other mechanism to retrieve the dynamic context); and then caches the dynamic context in cache 36. If subsequent stages of the processing stages 30 attempt to fetch the dynamic context, the cache requestor 34 detects this and supplies the cached context information to the processing stage of the stages 30 in response.

The cache requestor 34 may be implemented via a JSF phase listener in combination with a Bean proxy. The Bean proxy facilitates managing the cache 36 such that it properly maintains and selectively issues the retrieved dynamic context to the processing stages 30. The Bean proxy may maintain the Bean state information pertaining to the dynamic context, keeping it readily accessible to the processing stages 30.

Note that during the logic-invocation stage of the processing stages 30, as may occur just before the rendering stage (where UI display screen rendering instructions are generated), the associated request-processing module 30 may call webpage code 38 to facilitate populating a UI model being requested (e.g., via the JSF request 22) with data and functionality afforded via the webpage code 38.

The webpage code 38 may selectively access software applications, e.g., enterprise applications 16 and accompanying data 42, by calling one or more services, APIs, etc. that provide an interface 40 between the webpage code 38 and the applications 16.

Accordingly, use of embodiments as discussed herein may avoid a performance impact that would occur when several of the processing stages 30 repeatedly attempt to fetch dynamic context from the Faces context module 32. Use of the cache requestor 34 enables fetching of Bean properties only once per lifecycle of a given JSF request. The cache requestor 34 is readily implementable by those skilled in the art with access to the present teachings by using a JSF phase listener (also called a JSF phaseListener) and a Bean proxy (also called a BeanProxy) to keep that state information rapidly accessible to the processing stages 30.

Figure 2:
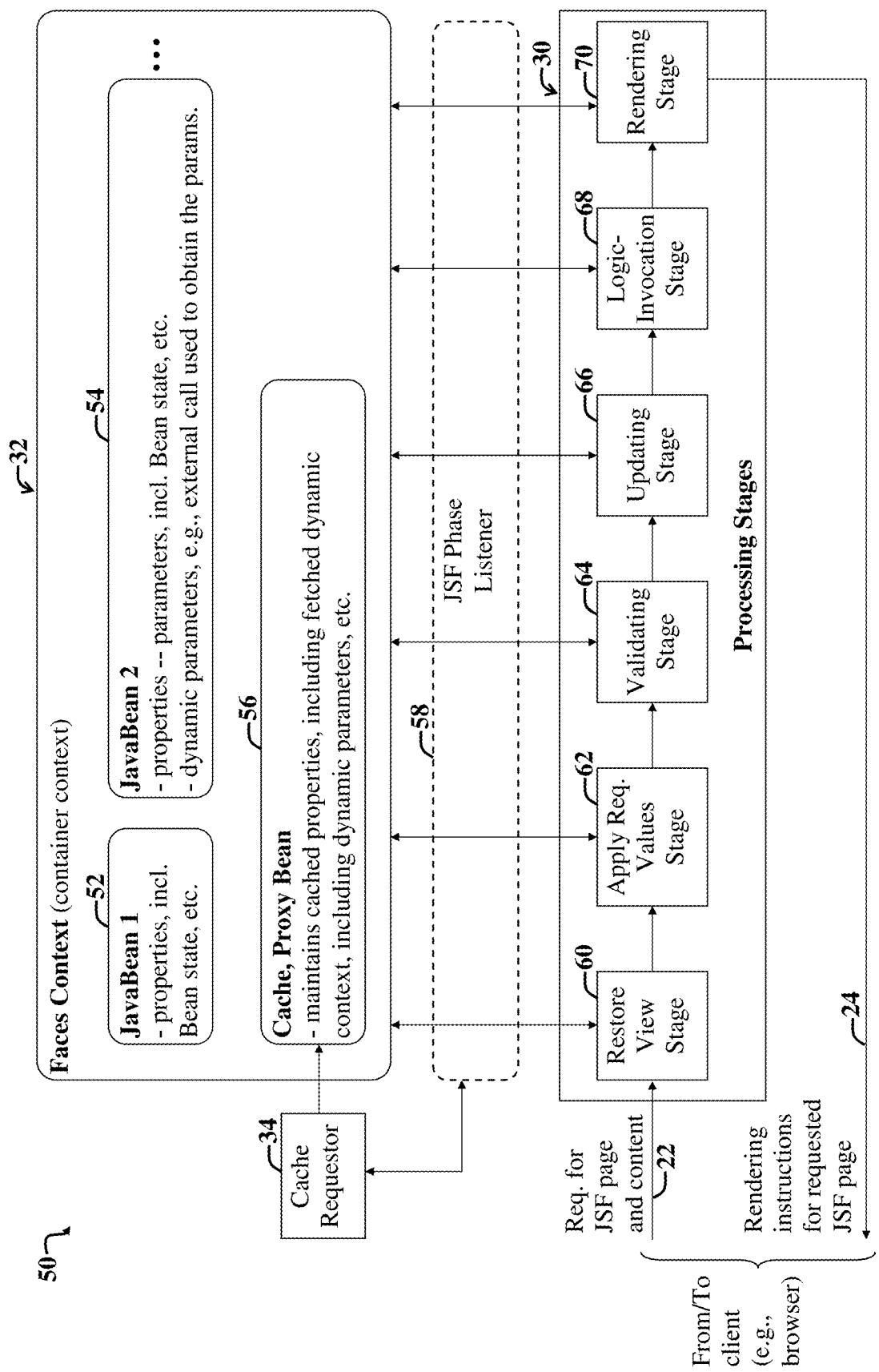
FIG. 2 is a second block diagram illustrating in more detail example of a JSF request message processing system that includes a context caching mechanism for facilitating efficient management of context information delivery to various request message processing stages for facilitating rendering a JSF page (i.e., webpage that uses JSF).

FIG. 2 is a second block diagram illustrating in more detail example of a JSF request message processing system 50 that includes a context caching mechanism 34, 56, 58 for facilitating efficient management of context information delivery to and/or from various request message processing stages 30 (60-70) for facilitating rendering a JSF page in response to an incoming request message 22.

The various processing stages 60-70 interact with context information maintained via Faces context 32, also called container context, as the Faces context is maintained using a web container (e.g., a J2EE Java Faces servlet container). The context information of the Faces context 32 is maintained via one or more programming language classes, e.g., JavaBeans 52, 54, 56, which may encapsulate and/or group data (e.g., parameters or properties representing context information) and/or functionality (e.g., code for implementing method calls to retrieve dynamic context information from external sources).

The example classes 53-56, called Beans herein, include context information represented by parameters specifying Bean properties, e.g., Bean state information. When the context information is static, i.e., does not rely on method calls to retrieve context information, the context information can be included among Bean properties.

When the context information is dynamic, e.g., the dynamic parameters of a second JavaBean 54, the parameters and associated context information is conventionally retrieved into the second JavaBean 54 by using a method call to a data source that is external to the web container that manages the context 32 and processing stages 30.

In the present example embodiment, a JSF phase listener 58 monitors communications between the various processing stages 60-70 to detect when dynamic context is initially requested by one or more of the processing stages 60-70. A first request by one or more of the processing stages 60-70 to retrieve dynamic context is detected by the JSF phase listener 58.

The JSF phase listener 58 then issues a detection signal to the cache requestor 34, which then generates a corresponding cache 56 and accompanying entry in response thereto. The example cache 56 represents a proxy Bean. The proxy Bean 56 may be visualized as an additional container that may wrap one or more additional Beans 52, 54. The additional wrapping includes retrieved or cached dynamic parameters, i.e., context. The cached context can then be reused by the processing stages 60-70 without the need to invoke JavaBean methods, e.g., methods of the second JavaBean 54, to retrieve dynamic context, e.g., dynamic parameters or context via a method call to an external entity.

For the purposes of the present discussion, an external entity may be any computing resource that is not included within the web container used to implement, i.e., run the various modules 32, 60-70 of FIG. 2.

Note that lead lines and accompanying arrowheads connecting the various processing stages 60-70 of the processing stages 30 are illustrative and may vary, without departing from the scope of the present teachings. For example, the various stages 60-70 may include sub-processing, output of which may be used to produce rendering instructions as output of the processing stages 30, thereby bypassing subsequent processing stages (depending upon particulars of a given received request message). As another example, known error signaling may also occur between one or more of the modules 60-70 and outputs thereof. For example, if an error occurs during processing of the validating stage 64, a corresponding signal (not shown in FIG. 2) may be sent to the rendering stage 70.

A more detailed discussion pertaining to processing at each of the stages 60-70 follows. During an initial restore-view stage 60 (also called a component tree reconstruction stage), a view and accompanying event handlers and validators for UI components are constructed and saved via one or more Beans 52-56 of the Faces context 32. Accordingly, the restore-view stage 60 facilitates populating the Faces context 32 with information used by the other processing stages 62-70 to process the incoming request message 22.

Next, an apply-values stage 62 (also called an apply-request-values stage involving event processing), involves processing components of the component tree constructed during the restore-view stage 60. The component processing includes using the components to store request message parameters. Those skilled in the art will appreciate that in certain cases, request message processing will jump to the rendering stage 70 after the apply-values stage 62.

A validating stage 64 (also called performance-validation stage or a process-validation stage involving event processing) involves processing validators registered for the component tree. Component attribute rules are examined and compared to local values stored via the Faces context 32 for the corresponding component.

An updating stage 66 (also called a model-synchronization stage or an update-model-values stage involving event processing) involves scanning the component tree and setting object properties to local values for each component. Bean properties for the Faces context 32 are updated in accordance with component value attributes specified via the input request message 22.

A logic-invocation stage 68 (also called an application-logic-invocation stage, or an invoke-application stage involving event processing) involves using JSF to process application-level events, such as submitting forms; linking to other webpages, and so on.

A rendering stage 70 (also called a render-response stage) involves using the JSF container to generate rendering instructions for the associated JSF page of the input request message 22. For an initial request message, UI components are added to the component tree as the JavaServerPages (JSP) container generates the rendering instructions at the rendering stage 70. Otherwise, the preexisting component tree will be used by the JSP container to generate the page rendering instructions. After rendering, the page response state is saved via the Faces context 32, thereby enabling subsequent request messages to access the context 32 during their associated restore-view stages 60.

Note that conventionally, for a JSF page, JSF may repeatedly reference a Bean state (its properties), e.g., at least once per processing stage 60-70. When the data (e.g., properties specified via one or more Bean parameters) in the Bean is static, then request message processing performance degradation is relatively minimal, as compared to when the Bean properties (context) are dynamic, i.e., require use of external services or other calls to fetch data from outside of the JSF container implementing the processing stages 60-70.

To avoid performance impact resulting from repeated access to dynamic Bean properties at one or more of the processing stages 60-70, the present example embodiment employs the cache requestor 34 to selectively fetch dynamic Bean properties once. The cache requestor 34 communicates with the JSF phase listener 58 to determine or detect requests for dynamic context from a Bean; then caches the dynamic context using the proxy Bean 56. Accordingly, the proxy Bean 56 is used to keep the otherwise dynamic context (and associated Bean state information) for use during the processing stages 60-70 for a particular request message being processed.

To facilitate implementing the present example embodiment, several steps can be followed. First, a common interface can be created between the proxy 56 and the underlying Bean that is wrapped, contained, or otherwise interfaced using the proxy. The interface may have getters for the dynamic properties that are to be cached. Note that while the proxy Bean 56 is shown separately from the second Bean 54 that includes dynamic context, that the proxy Bean 56 may be visualized as a container around the second Bean 54, where the container stores cached (previously retrieved) dynamic context (e.g., dynamic parameters indicating Bean state).

Note that the proxy Bean 56 may keep the cache; implement each method in the accompanying interface; and use a lazy loading pattern to delegate the real call to the Bean 54. Note that additional proxy Beans 56 may be created as needed during request message processing. The proxy Bean(s) 56 is/are registered in the Faces context 32.

The proxy Bean 56 may be registered with the JSF phase listener 58. Note that multiple JSF phase listeners 58 may be used for multiple corresponding JSF pages. Furthermore, note that some of the beans 52-56 may be used by more than one webpage.

After completion of the processing stages 60-70, the lifecycle of a request message is complete. The cache used by the proxy Bean 56 is then cleaned. The JSF phase listener 58 may facilitate registering Beans 52-56 in the Faces context 32. The cache requestor 34 and accompanying proxy Bean 56 includes code for facilitating keeping and fetching Bean properties only once during the lifecycle of the request.

In summary, in the present example embodiment, the incoming request message 22 represents a JSF request, and the processing of the request involves plural stages 60-70 of processing, each stage of which may fetch or get context information 32 for use by the stage. Fetched context information includes dynamic or static context information.

At each of the plural stages 60-70, one or more context fetches (also called context requests herein) are generated by the processing. The context information 32 to be fetched may include one or more properties describing a Bean (JavaBean (JB)) state.

The JSF phase listener 58 facilitates intercepting and/or analyzing context fetches during the processing of the JSF request 22. The Bean proxy 56 maintains the cache, which is used to store fetched dynamic context (resulting in the cached context) for use by subsequent request processing stages. The cached context may include dynamic context retrieved using one or more web services or Application Programming Interfaces (APIs) for retrieving context from outside of a container (e.g., JSF container), e.g., from another system.

The JSF phase listener 58 (also called a Faces listener herein) may register Beans in a context storage mechanism 32 (called the container context). The cache requestor 34, which uses the JSF phase listener 58, retrieves and caches properties pertaining to the dynamic context for each request lifecycle.

Figure 3:
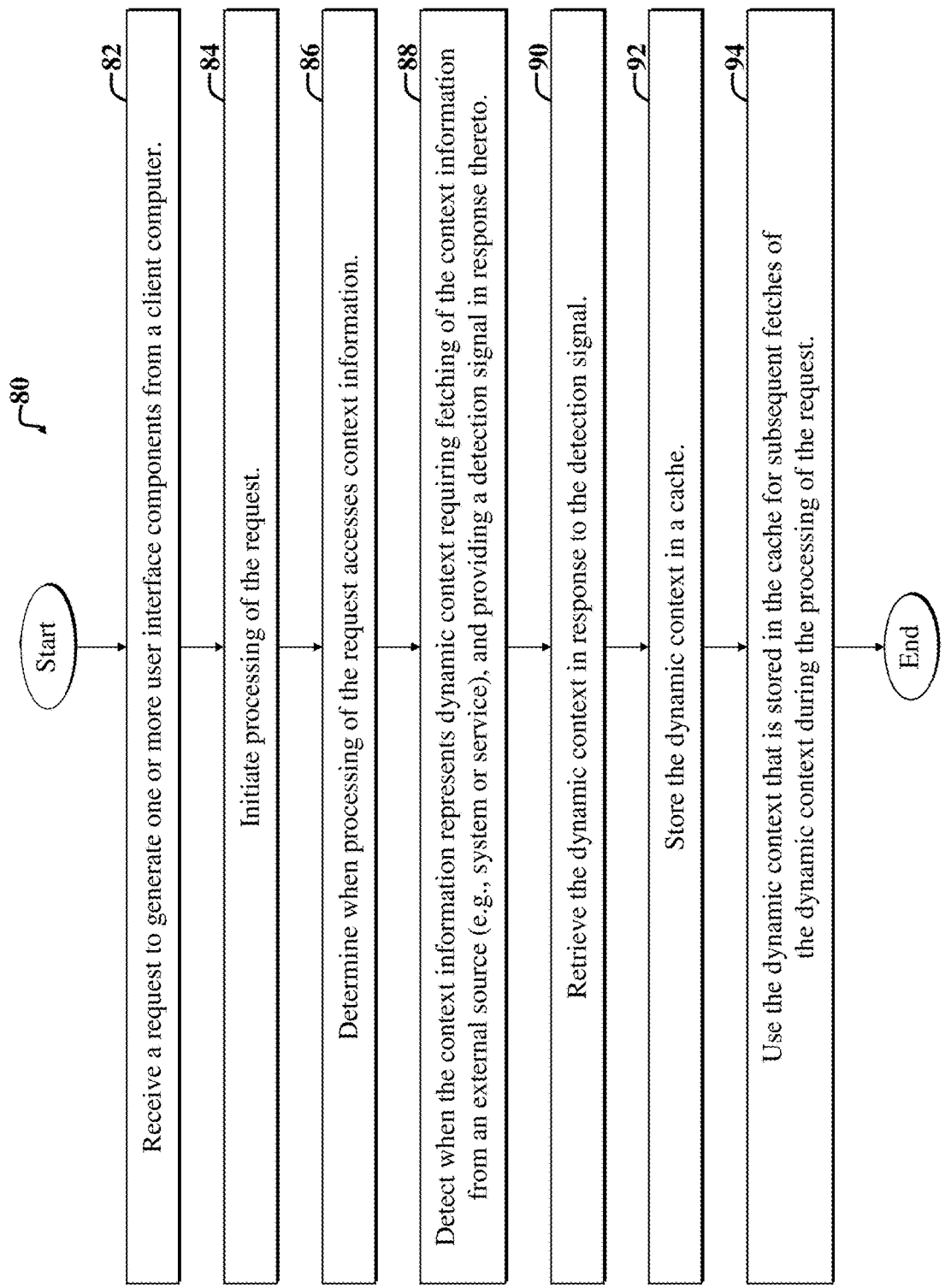
FIG. 3 is a flow diagram of an example method implementable via the embodiment of FIG. 1.

FIG. 3 is a flow diagram of an example method 80 implementable via the embodiment of FIG. 1. The example method 50 facilitates enhancing web application performance.

The example method 50 includes a first step 82, which involves receiving a request to generate one or more user interface components from a client computer (e.g., the client system 12 of FIG. 1). The request may include or represent, for example, a JSF request for content.

A second step 84 includes initiating processing of the request.

A third step 86 includes determining when processing of the request accesses context information, e.g., when one or more of the request processing stages 30 of FIG. 1 references the Faces context 32 to fetch context information.

A fourth step 88 includes detecting when the context information represents dynamic context requiring fetching of the context information from an external source (e.g., system or service), and providing a detection signal in response thereto. The detection signal may be generated via a JSF phase listener of the cache requestor 34 of FIG. 1, which listens or monitors each of the processing stages 30.

A fifth step 90 includes retrieving the dynamic context in response to the detection signal.

A sixth step 92 includes storing the dynamic context in a cache, i.e., a mechanism that makes the resulting cached context rapidly available to the processing stages 30 of FIG. 1. Note that the dynamic context may be retrieved by the cache requestor 34 of FIG. 1 during the fifth step 90 and then cached in a state or via a mechanism that is rapidly accessible to the processing stages 30 as needed in the sixth step 92.

A seventh step 94 includes using the dynamic context that is stored in the cache for subsequent requests for the dynamic context during the processing of the request.

Note that the example method 80 may be altered without departing from the scope of the present teachings. For example, the method 80 may further specify that the request represents a JavaServer Faces (JSF) request; that the processing of the request includes plural stages; that the plural stages include a restore-view stage, an apply-values stage, a validate stage, an update stage, a logic-invocation stage, and a rendering stage; that at each of the plural stages, one or more context fetches are generated by the processing; that the one or more context fetches include a fetch to access context information; the context information includes one or more properties describing a JavaBean (JB) state; the context information includes the dynamic context information, and so on.

The example method 80 may further specify that the fourth step 86 further includes employing a JSF phase listener to intercept or analyze context requests during the processing of the JSF request, and using a JavaBean (JB) proxy to maintain the cache, wherein the cache stores fetched dynamic context. The fetched dynamic context may include dynamic context that has been retrieved using one or more web services or Application Programming Interfaces (APIs).

After the lifecycle of the request, i.e., after processing of the request, the cache may be cleaned. JSF phase listeners may register JavaBeans (JB) in context (e.g., the Faces context 32 of FIG. 1). A cache requestor (e.g., the cache requestor 34 of FIG. 1) facilitates asking external systems and services for properties (corresponding to the dynamic context) and keeping the resulting properties for immediate use by processing stages of a given JSF request message processing lifecycle.

Figure 4:
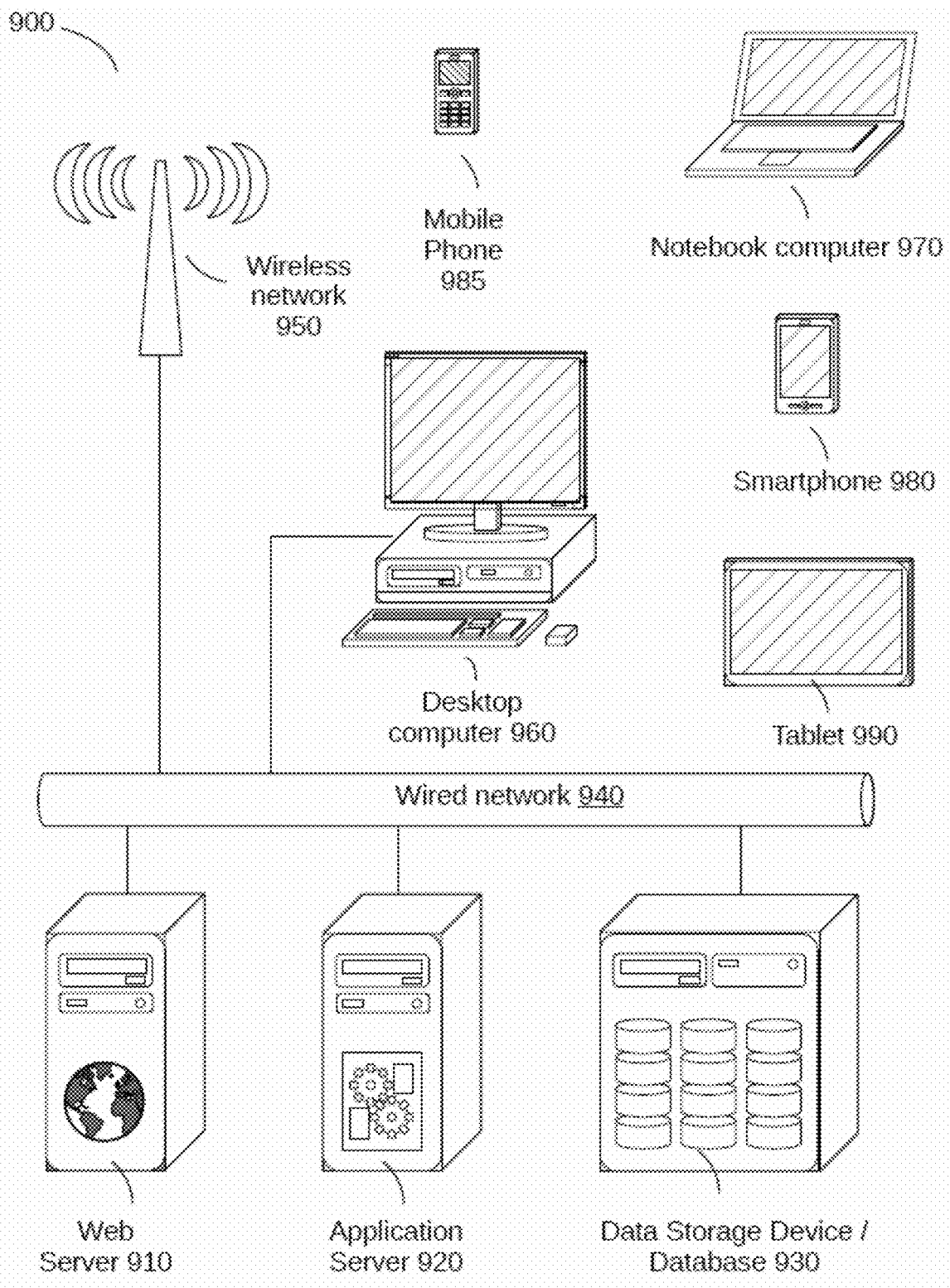
FIG. 4 is a general block diagram of a system and accompanying computing environment usable to implement the embodiments of FIGS. 1-2.

FIG. 4 is a general block diagram of a system 900 and accompanying computing environment usable to implement the embodiments of FIGS. 1-3. The example system 900 is capable of supporting or running various hardware and/or software modules and associated methods discussed with reference to FIGS. 1-3. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as Rich Site Summary (RSS) feeds of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computer.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 4, the client system 46 of FIG. 1 may be implemented in whole or in part via one or more of the desktop computer 960, notebook computer 970, smartphone 980, mobile phone 985, tablet 990, and/or other computing devices. The computing devices 960-990 may run browsers, e.g., the client-side software (browser) 20 of FIG. 1.

The browser 20 of FIG. 1 may employ a network, such as the Internet (corresponding to the wired network 940, and optionally, the wireless network 950 of FIG. 4) to browse to one or more URLs corresponding to websites and associated web applications 28, 38 of FIG. 1 to access, use, and/or otherwise manipulate data and functionality thereof.

Figure 5:
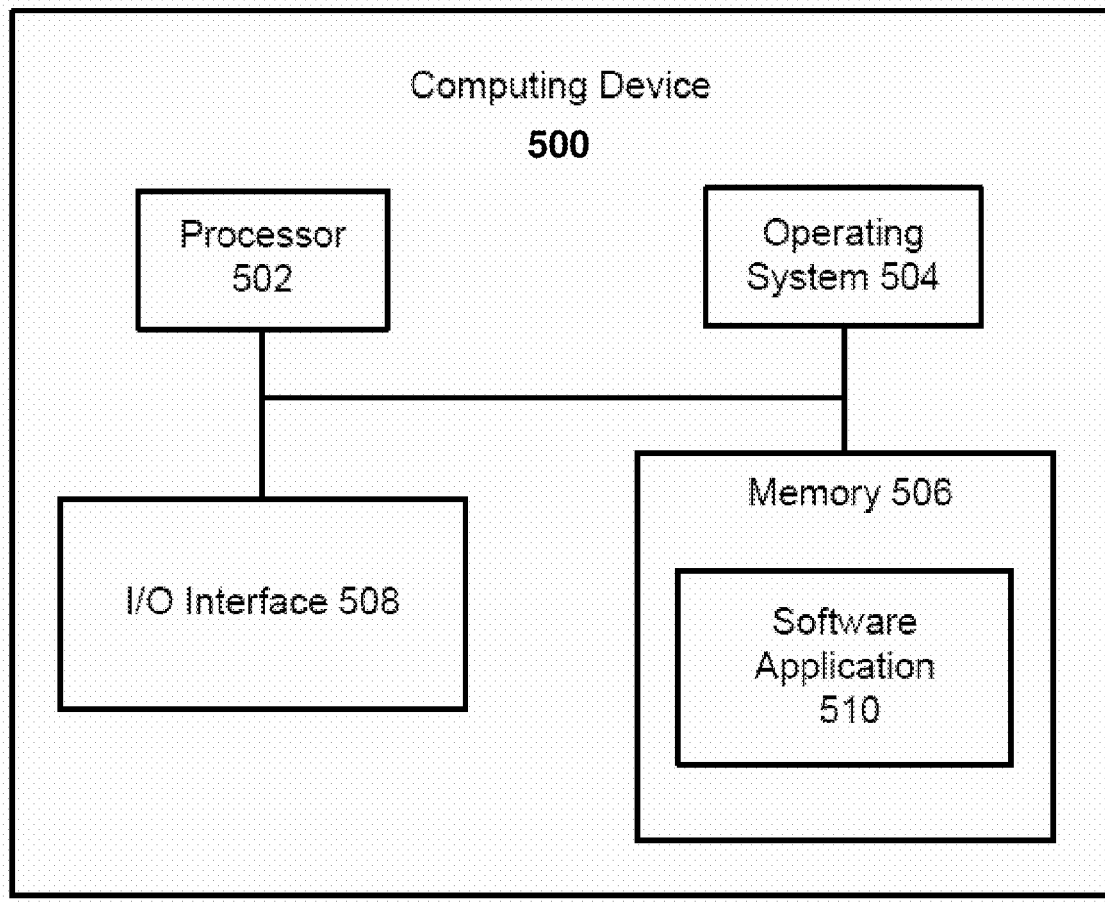
FIG. 5 is a general block diagram of a computing device usable to implement the embodiments of FIGS. 1-3.

Note that generally, the server system 14 and backend enterprise applications 16 and associated interfaces 40 of FIG. 1 may be implemented via one or more of the servers 910, 920 of FIG. 5. Similarly, the backend databases 42 of FIG. 1 may be hosted by one or more of the data storage device(s) and database(s) 930, which are accessible to the servers 910, 920 via the wired network 940.

More specifically, the container 26 and accompanying request-processing functionality 28 (including the processing stages 30, cache requestor 34, Faces context 32, and cache 36) and webpage code 38 of FIG. 1 may run on one or more web servers, as represented by the web server 910 of FIG. 4.

The enterprise applications 16 of FIG. 1 may run on an application server 920, which communicates (e.g., via one or more web services and/or APIs 40) with web page code 38 of FIG. 1 running on the web server 910 of FIG. 4. The web page code 38 of FIG. 1 is accessible via one or more websites that may be browsed to via the client system 12 and accompanying browser 20 of FIG. 1.

Furthermore, note that various embodiments discussed here may provide substantial benefits to webpage performance and associated request message processing. Performance degradation resulting from multiple access of dynamic context during various stages of request message processing is obviated via use of selective context-caching mechanisms and methods disclosed herein.

FIG. 5 is a general block diagram of a computing device 500 usable to implement the embodiments described herein. While the computing device 500 of FIG. 5 may be described as performing one or more of the steps in the embodiments herein. In other embodiments, any suitable component or combination of components of the computing device 500 or any suitable processor or processors associated with system 500 may facilitate performing the steps.

FIG. 5 illustrates a block diagram of an example computing system 500, which may be used for implementations described herein. For example, computing system 500 may be used to implement server devices 910, 920 of FIG. 4 as well as to perform the method implementations described herein.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address use of caching mechanisms for selectively caching dynamic context using one or more Bean proxies and a JSF phase listener during processing of JSF request messages, embodiments are not limited thereto. Other types of request message processing, i.e., other than JSF request message processing, may benefit from use of mechanisms and methods discussed herein for selective caching of dynamic context used for message processing. Furthermore, while various embodiments are discussed herein within the context of cloud-based enterprise applications, embodiments are not limited thereto.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including instructions executable by one or more processors for:
    receiving a user interface request from a client computer to generate one or more user interface components;
    initiating processing of the user interface request;
    determining when processing of the user interface request accesses context information;
    detecting when the context information represents dynamic context requiring fetching of the context information from an external source;
    providing a detection signal in response to the detecting;
    retrieving the dynamic context in response to the detection signal;
    generating a cache for storing the dynamic context in response to the detection signal;
    storing the dynamic context in the cache;
    using the dynamic context that is stored in the cache for subsequent dynamic context requests for the dynamic context during the processing of the user interface request; and
    cleaning the cache after the processing of the user interface request has completed.

2. The non-transitory computer readable medium of claim 1, wherein the user interface request represents a JavaServer Faces (JSF) request.

3. The non-transitory computer readable medium of claim 2, wherein the processing of the user interface request includes plural stages.

4. The non-transitory computer readable medium of claim 3, wherein the plural stages include a restore-view stage, an apply-values stage, a validate stage, an update stage, a logic-invocation stage, and a rendering stage.

5. The non-transitory computer readable medium of claim 4, wherein at each of the plural stages, one or more context fetches are generated by the processing.

6. The non-transitory computer readable medium of claim 5, wherein the one or more context fetches include a fetch to access the context information.

7. The non-transitory computer readable medium of claim 6, wherein the context information includes one or more properties describing a JavaBean (JB) state.

8. The non-transitory computer readable medium of claim 6, wherein the context information includes the dynamic context.

9. The non-transitory computer readable medium of claim 2, wherein the detecting includes employing a JSF phase listener to intercept or analyze context fetches during the processing of the JSF request.

10. The non-transitory computer readable medium of claim 9, wherein the detecting further includes using a JavaBean (JB) proxy to maintain the cache, wherein the cache stores fetched dynamic context, and wherein the fetched dynamic context includes dynamic context retrieved using one or more web services or Application Programming Interfaces (APIs).

11. A method for enhancing web application performance, the method comprising:
    receiving a user interface request from a client computer to generate one or more user interface components;
    initiating processing of the user interface request;
    determining when processing of the user interface request accesses context information;
    detecting when the context information represents dynamic context requiring fetching of the context information from an external source;
    providing a detection signal in response to the detecting;
    retrieving the dynamic context in response to the detection signal;
    generating a cache for storing the dynamic context in response to the detection signal;
    storing the dynamic context in the cache;
    using the dynamic context that is stored in the cache for subsequent dynamic context requests for the dynamic context during the processing of the user interface request; and
    cleaning the cache after the processing of the user interface request has completed.

12. The method of claim 11, wherein the user interface request represents a JavaServer Faces (JSF) request.

13. The method of claim 12, wherein the processing of the user interface request includes plural stages.

14. The method of claim 13, wherein the plural stages include a restore-view stage, an apply-values stage, a validate stage, an update stage, a logic-invocation stage, and a rendering stage.

15. The method of claim 14, wherein at each of the plural stages, one or more context fetches are generated by the processing.

16. The method of claim 15, wherein the one or more context fetches include a fetch to access the context information.

17. The method of claim 16, wherein the context information includes one or more properties describing a JavaBean (JB) state.

18. The method of claim 16, wherein the context information includes the dynamic context.

19. The method of claim 12, wherein detecting includes:
    employing a JSF phase listener to intercept or analyze context fetches during the processing of the JSF request; and
    using a JavaBean (JB) proxy to maintain the cache, wherein the cache stores fetched dynamic context, and wherein the fetched dynamic context includes dynamic context retrieved using one or more web services or Application Programming Interfaces (APIs).

20. An apparatus comprising:

one or more processors;

a non-transitory computer readable medium including instructions executable by the one or more processors for:

receiving a user interface request from a client computer to generate one or more user interface components;

initiating processing of the user interface request;

determining when processing of the user interface request accesses context information;

detecting when the context information represents dynamic context requiring fetching of the context information from an external source;

providing a detection signal in response to the detecting;

retrieving the dynamic context in response to the detection signal;

generating a cache for storing the dynamic context in response to the detection signal;

storing the dynamic context in the cache;

using the dynamic context that is stored in the cache for subsequent dynamic context requests for the dynamic context during the processing of the user interface request; and cleaning the cache after the processing of the user interface request has completed.

* * * * *